US009476267B2

(12) United States Patent
Orgeron et al.

(10) Patent No.: US 9,476,267 B2
(45) Date of Patent: *Oct. 25, 2016

(54) SYSTEM AND METHOD FOR RAISING AND LOWERING A DRILL FLOOR MOUNTABLE AUTOMATED PIPE RACKING SYSTEM

(71) Applicants: Keith J. Orgeron, Spring, TX (US); Mark W. Trevithick, Houston, TX (US)

(72) Inventors: Keith J. Orgeron, Spring, TX (US); Mark W. Trevithick, Houston, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/843,998

(22) Filed: Mar. 15, 2013

(65) Prior Publication Data
US 2015/0300104 A1 Oct. 22, 2015

(51) Int. Cl.
E21B 19/15 (2006.01)
E21B 19/14 (2006.01)
E21B 15/00 (2006.01)
E21B 19/16 (2006.01)

(52) U.S. Cl.
CPC ............ E21B 19/155 (2013.01); E21B 15/00 (2013.01); E21B 19/14 (2013.01); E21B 19/16 (2013.01)

(58) Field of Classification Search
CPC .............................. E21B 15/00; E21B 19/155
USPC ......... 414/22.51–22.59, 22.61–22.69, 22.71, 414/917
See application file for complete search history.

(56) References Cited

U.S. PATENT DOCUMENTS

| 62,404 | A | 2/1867 | Gile et al. |
|---|---|---|---|
| 184,168 | A | 11/1876 | Nickle |
| 364,077 | A | 5/1887 | Addis |
| 514,715 | A | 2/1894 | Jenkins |
| 1,175,792 | A | 3/1916 | Mickelsen |
| 1,264,867 | A | 4/1918 | Schuh |
| 1,312,009 | A | 8/1919 | Thrift |
| 1,318,789 | A | 10/1919 | Moschel |
| 1,369,165 | A | 2/1921 | Cochran et al. |
| 1,396,317 | A | 11/1921 | Boyter |
| 1,417,490 | A | 5/1922 | Brandon |
| 1,483,037 | A | 2/1924 | Zallinger |
| 1,768,861 | A | 7/1930 | Richards |
| 1,972,635 | A | 9/1934 | Whinnen |

(Continued)

FOREIGN PATENT DOCUMENTS

| CA | 1247590 A | * | 12/1988 |
|---|---|---|---|
| EP | 0 024 433 A1 | | 3/1981 |

(Continued)

OTHER PUBLICATIONS

U.S. Appl. No. 12/111,907, filed Apr. 29, 2008; non-published; titled "Pipe Gripping Apparatus" and having common inventors with the present patent application.

(Continued)

Primary Examiner — Gregory Adams
(74) Attorney, Agent, or Firm — John G. Fischer, Esq.; Scheef & Stone, L.L.P.

(57) ABSTRACT

The present invention relates to a new apparatus and method for use in subterranean exploration. The present invention provides a rapid rig-up and rig-down of a drill floor mounted device such as a pipe racking system. In particular, the present invention discloses a system and method for rapid deployment of a drill floor mounted pipe racking system that is capable of being retrofit to an existing drilling rig.

27 Claims, 12 Drawing Sheets

(56) References Cited

U.S. PATENT DOCUMENTS

| | | |
|---|---|---|
| 1,981,304 A | 11/1934 | Brandt |
| 2,124,154 A | 7/1937 | Sovincz |
| 2,147,002 A | 2/1939 | Volpin |
| 2,327,461 A | 8/1943 | Rowe |
| 2,328,197 A | 8/1943 | Cowin |
| 2,369,534 A | 2/1945 | Cohen |
| 2,382,767 A | 8/1945 | Zeilman |
| 2,476,210 A | 7/1949 | Moore |
| 2,497,083 A | 2/1950 | Hildebrand |
| 2,509,853 A | 5/1950 | Wilson |
| 2,535,054 A | 12/1950 | Ernst |
| 2,595,307 A | 5/1952 | Selberg |
| 2,592,168 A | 8/1952 | Morris et al. |
| 2,710,431 A | 6/1955 | Griffon |
| 2,715,014 A | 8/1955 | Garnett et al. |
| 2,770,493 A | 11/1956 | Fieber |
| 2,814,396 A | 11/1957 | Neal, Sr. |
| 2,828,024 A | 3/1958 | True |
| 2,840,244 A | 6/1958 | Thomas, Jr. |
| 2,937,726 A | 5/1960 | Manfred et al. |
| 3,016,992 A | 1/1962 | Wilson |
| 3,033,529 A | 5/1962 | Pierrat |
| 3,059,905 A | 10/1962 | Tompkins |
| 3,076,560 A | 2/1963 | Bushong et al. |
| 3,136,394 A | 6/1964 | Woolslayer et al. |
| 3,177,944 A | 4/1965 | Knights |
| 3,180,496 A | 4/1965 | Smith |
| 3,194,313 A | 7/1965 | Fanshawe |
| 3,262,593 A | 7/1966 | Hainer |
| 3,280,920 A | 10/1966 | Scott |
| 3,290,006 A | 12/1966 | Dubberke |
| 3,331,585 A | 7/1967 | Dubberke |
| 3,365,762 A | 1/1968 | Spiri |
| 3,421,269 A | 1/1969 | Medow |
| 3,425,322 A | 2/1969 | Zucchellini |
| 3,432,159 A | 3/1969 | Rakatansky |
| 3,464,507 A | 9/1969 | Alexander et al. |
| 3,477,522 A | 11/1969 | Templeton |
| 3,498,375 A | 3/1970 | McEwen et al. |
| 3,559,821 A | 2/1971 | James |
| 3,561,811 A | 2/1971 | Turner, Jr. |
| 3,633,466 A | 1/1972 | Field |
| 3,633,771 A | 1/1972 | Woolslayer et al. |
| 3,675,303 A | 7/1972 | McKinnon |
| 3,682,259 A | 8/1972 | Cintract et al. |
| 3,702,640 A | 11/1972 | Cintract et al. |
| 3,703,968 A | 11/1972 | Uhrich et al. |
| 3,706,347 A | 12/1972 | Brown |
| 3,734,208 A | 5/1973 | Otto |
| 3,774,781 A | 11/1973 | Merkley |
| 3,792,783 A | 2/1974 | Brown |
| 3,797,672 A | 3/1974 | Vermette |
| 3,804,264 A | 4/1974 | Hedeen et al. |
| 3,805,463 A | 4/1974 | Lang et al. |
| 3,806,021 A | 4/1974 | Moroz et al. |
| 3,823,916 A | 7/1974 | Shaw |
| 3,848,850 A | 11/1974 | Bemis |
| 3,860,122 A | 1/1975 | Cernosek |
| 3,883,009 A | 5/1975 | Swoboda et al. |
| 3,942,593 A | 3/1976 | Reeve, Jr. et al. |
| 3,963,133 A | 6/1976 | Gilli |
| 3,986,619 A | 10/1976 | Woolslayer et al. |
| 3,991,887 A | 11/1976 | Trout |
| 3,995,746 A | 12/1976 | Usagida |
| 4,011,694 A | 3/1977 | Langford |
| 4,030,698 A | 6/1977 | Hansen |
| 4,044,952 A | 8/1977 | Williams et al. |
| 4,135,340 A | 1/1979 | Cox et al. |
| 4,138,805 A * | 2/1979 | Patterson .................. 52/118 |
| 4,142,551 A | 3/1979 | Wilms |
| 4,158,283 A | 6/1979 | Nation |
| 4,172,684 A | 10/1979 | Jenkins |
| 4,201,022 A | 5/1980 | Jennings |
| 4,221,269 A | 9/1980 | Hudson |
| 4,226,167 A | 10/1980 | Lew |
| 4,269,554 A | 5/1981 | Jackson |
| 4,276,918 A | 7/1981 | Sigouin |
| 4,277,044 A | 7/1981 | Hamilton |
| 4,290,495 A | 9/1981 | Elliston |
| 4,297,908 A | 11/1981 | Zimmer |
| 4,303,270 A | 12/1981 | Adair |
| 4,336,840 A | 6/1982 | Bailey |
| 4,338,965 A | 7/1982 | Garnjost et al. |
| 4,359,089 A | 11/1982 | Strate et al. |
| 4,383,455 A | 5/1983 | Tuda et al. |
| 4,386,883 A | 6/1983 | Hogan et al. |
| 4,403,666 A | 9/1983 | Willis |
| 4,403,897 A | 9/1983 | Willis |
| 4,403,898 A | 9/1983 | Thompson |
| 4,407,629 A * | 10/1983 | Willis .................. 414/745.2 |
| 4,420,917 A | 12/1983 | Parlanti |
| 4,426,182 A | 1/1984 | Frias et al. |
| 4,440,536 A | 4/1984 | Scaggs |
| 4,492,501 A | 1/1985 | Haney |
| 4,529,094 A | 7/1985 | Wadsworth |
| 4,547,110 A * | 10/1985 | Davidson .................. 414/22.55 |
| 4,586,572 A | 5/1986 | Myers et al. |
| 4,595,066 A | 6/1986 | Nelmark et al. |
| 4,598,509 A | 7/1986 | Woolslayer et al. |
| 4,604,724 A | 8/1986 | Shaginian et al. |
| 4,605,077 A | 8/1986 | Boyadjieff |
| 4,650,237 A | 3/1987 | Lessway |
| 4,658,970 A | 4/1987 | Oliphant |
| 4,681,172 A | 7/1987 | Mikiya et al. |
| 4,688,983 A | 8/1987 | Lindbom |
| 4,702,663 A | 10/1987 | Mischke et al. |
| 4,708,581 A | 11/1987 | Adair |
| 4,756,204 A | 7/1988 | Wittwer et al. |
| 4,759,414 A * | 7/1988 | Willis .................. 175/170 |
| 4,765,225 A | 8/1988 | Birchard |
| 4,765,401 A | 8/1988 | Boyadjieff |
| 4,767,100 A | 8/1988 | Philpot |
| 4,821,816 A * | 4/1989 | Willis .................. 175/57 |
| 4,822,230 A | 4/1989 | Slettedal |
| 4,834,604 A | 5/1989 | Brittain et al. |
| 4,837,992 A | 6/1989 | Hashimoto |
| 4,869,137 A | 9/1989 | Slator |
| 4,982,853 A | 1/1991 | Kishi |
| 5,060,762 A | 10/1991 | White |
| 5,121,793 A | 6/1992 | Busch et al. |
| 5,135,119 A | 8/1992 | Larkin |
| 5,150,642 A | 9/1992 | Moody et al. |
| 5,186,264 A | 2/1993 | du Chaffaut |
| 5,255,751 A | 10/1993 | Stogner |
| 5,415,057 A | 5/1995 | Nihei et al. |
| 5,423,390 A | 6/1995 | Donnally et al. |
| 5,458,454 A | 10/1995 | Sorokan |
| 5,481,959 A | 1/1996 | Watanabe et al. |
| 5,486,084 A | 1/1996 | Pitman et al. |
| 5,595,248 A | 1/1997 | Denny |
| 5,597,987 A | 1/1997 | Gilliland et al. |
| 5,609,226 A | 3/1997 | Penisson |
| 5,609,260 A | 3/1997 | Liao |
| 5,609,457 A | 3/1997 | Burns |
| 5,649,745 A | 7/1997 | Anderson |
| 5,660,087 A | 8/1997 | Rae |
| 5,671,932 A | 9/1997 | Chapman |
| 5,702,139 A | 12/1997 | Buck |
| 5,806,589 A | 9/1998 | Lang |
| 5,816,565 A | 10/1998 | McGuffin |
| 5,848,647 A | 12/1998 | Webre et al. |
| 5,915,673 A | 6/1999 | Kazerooni |
| 5,931,238 A * | 8/1999 | Gilmore et al. .................. 175/52 |
| 5,934,028 A | 8/1999 | Taylor |
| 5,957,431 A | 9/1999 | Serda, Jr. |
| 5,964,550 A | 10/1999 | Blandford et al. |
| 5,988,299 A | 11/1999 | Hansen et al. |
| 5,992,801 A | 11/1999 | Torres |
| 5,993,140 A | 11/1999 | Crippa |
| 6,003,598 A | 12/1999 | Andreychuk |
| 6,053,255 A | 4/2000 | Crain |
| 6,079,490 A | 6/2000 | Newman |
| 6,079,925 A | 6/2000 | Morgan et al. |
| 6,158,516 A | 12/2000 | Smith et al. |

(56) References Cited

U.S. PATENT DOCUMENTS

| | | |
|---|---|---|
| 6,220,807 B1 | 4/2001 | Sorokan |
| 6,227,587 B1 | 5/2001 | Terral |
| 6,234,253 B1 | 5/2001 | Dallas |
| 6,237,445 B1 | 5/2001 | Wesch, Jr. |
| 6,253,845 B1 | 7/2001 | Belik |
| 6,263,763 B1 | 7/2001 | Feigel, Jr. et al. |
| 6,264,128 B1 | 7/2001 | Shampine et al. |
| 6,264,395 B1 | 7/2001 | Allamon et al. |
| 6,276,450 B1 | 8/2001 | Seneviratne |
| 6,279,662 B1 | 8/2001 | Sonnier |
| 6,298,928 B1 | 10/2001 | Penchansky |
| 6,311,788 B1 | 11/2001 | Weixler |
| 6,343,892 B1 | 2/2002 | Kristiansen |
| 6,398,186 B1 | 6/2002 | Lemoine |
| 6,431,286 B1 | 8/2002 | Andreychuk |
| 6,471,439 B2 | 10/2002 | Allamon et al. |
| 6,502,641 B1 | 1/2003 | Carriere et al. |
| 6,524,049 B1 | 2/2003 | Minnes |
| 6,533,045 B1 | 3/2003 | Cooper |
| 6,543,551 B1 | 4/2003 | Sparks et al. |
| 6,543,555 B2 | 4/2003 | Casagrande |
| 6,550,128 B1 | 4/2003 | Lorenz |
| 6,557,641 B2 | 5/2003 | Sipos |
| 6,564,667 B2 | 5/2003 | Bayer et al. |
| 6,581,698 B1 | 6/2003 | Dirks |
| 6,609,573 B1 | 8/2003 | Day |
| 6,705,414 B2 | 3/2004 | Simpson et al. |
| 6,745,646 B1 | 6/2004 | Pietras et al. |
| 6,748,823 B2 | 6/2004 | Pietras |
| 6,763,898 B1 | 7/2004 | Roodenburg et al. |
| 6,779,614 B2 | 8/2004 | Oser |
| 6,814,149 B2 | 11/2004 | Liess et al. |
| 6,845,814 B2 | 1/2005 | Mason et al. |
| 6,854,520 B1 | 2/2005 | Robichaux |
| 6,969,223 B2 | 11/2005 | Tolmon et al. |
| 7,021,880 B2 | 4/2006 | Morelli et al. |
| 7,028,585 B2 | 4/2006 | Pietras et al. |
| 7,036,202 B2 | 5/2006 | Lorenz |
| 7,044,315 B2 | 5/2006 | Willim |
| 7,055,594 B1 | 6/2006 | Springett et al. |
| 7,077,209 B2 | 7/2006 | McCulloch et al. |
| 7,090,035 B2 | 8/2006 | Lesko |
| 7,090,254 B1 | 8/2006 | Pietras et al. |
| 7,117,938 B2 | 10/2006 | Hamilton et al. |
| 7,121,166 B2 | 10/2006 | Drzewiecki |
| 7,172,038 B2 | 2/2007 | Terry et al. |
| 7,246,983 B2 | 7/2007 | Zahn et al. |
| 7,249,639 B2 | 7/2007 | Belik |
| 7,289,871 B2 | 10/2007 | Williams |
| 7,296,623 B2 | 11/2007 | Koithan et al. |
| 7,331,746 B2 | 2/2008 | Wright et al. |
| 7,398,833 B2 | 7/2008 | Ramey et al. |
| 7,413,398 B2 | 8/2008 | Bangert et al. |
| 7,438,127 B2 | 10/2008 | Lesko |
| 7,452,177 B2 | 11/2008 | Gokita |
| 7,503,394 B2 | 3/2009 | Bouligny |
| 7,513,312 B2 | 4/2009 | Carriere et al. |
| 7,726,929 B1 | 6/2010 | Orgeron |
| 7,794,192 B2 | 9/2010 | Wright et al. |
| 7,841,415 B2 | 11/2010 | Winter |
| 7,918,636 B1 | 4/2011 | Orgeron |
| 7,980,802 B2 | 7/2011 | Orgeron |
| 8,172,497 B2 | 5/2012 | Orgeron et al. |
| 8,192,128 B2 | 6/2012 | Orgeron |
| 8,192,129 B1 | 6/2012 | Orgeron |
| 8,506,229 B2 | 8/2013 | Orgeron |
| 8,876,452 B2 | 11/2014 | Orgeron et al. |
| 8,905,699 B2 | 12/2014 | Orgeron |
| 9,091,128 B1 | 7/2015 | Orgeron et al. |
| 2002/0070187 A1 | 6/2002 | Willim |
| 2002/0079105 A1 | 6/2002 | Bergeron |
| 2003/0170095 A1 | 9/2003 | Slettedal |
| 2003/0221871 A1 | 12/2003 | Hamilton et al. |
| 2005/0269133 A1 | 12/2005 | Little |
| 2006/0027793 A1 | 2/2006 | Kysely |
| 2006/0045654 A1 | 3/2006 | Guidroz |
| 2006/0104747 A1 | 5/2006 | Zahn et al. |
| 2006/0113073 A1 | 6/2006 | Wright et al. |
| 2007/0286707 A1 | 12/2007 | Eddowes et al. |
| 2008/0174131 A1 | 7/2008 | Bouligny et al. |
| 2008/0202812 A1 | 8/2008 | Childers et al. |
| 2008/0253866 A1 | 10/2008 | Lops et al. |
| 2009/0257848 A1 | 10/2009 | Stroshein et al. |
| 2009/0279987 A1 | 11/2009 | Jantzen |
| 2010/0034620 A1 | 2/2010 | Orgeron |
| 2010/0104401 A1 | 4/2010 | Hopkins et al. |
| 2010/0329823 A1* | 12/2010 | Baumler et al. ............ 414/22.55 |
| 2011/0079434 A1 | 4/2011 | Belik et al. |
| 2012/0118639 A1 | 5/2012 | Gerber |
| 2012/0167485 A1 | 7/2012 | Trevithick et al. |

FOREIGN PATENT DOCUMENTS

| | | |
|---|---|---|
| EP | 0192452 A1 | 8/1986 |
| EP | 1752608 A2 | 2/2007 |
| EP | 1980709 A1 | 10/2008 |
| GB | 727780 | 4/1955 |
| JP | 05-044385 A | 2/1993 |
| WO | 93/15303 A1 | 8/1993 |
| WO | 2004/018829 A1 | 3/2004 |
| WO | 2006/038790 A1 | 4/2006 |
| WO | 2008/034262 A1 | 3/2008 |
| WO | 2009/055590 A2 | 4/2009 |
| WO | 2011/120627 A2 | 10/2011 |
| WO | 2014144995 A1 | 9/2014 |

OTHER PUBLICATIONS

U.S. Appl. No. 13/843,920, filed Mar. 15, 2013; non-published; titled "Drill Floor Mountable Automated Pipe Racking System and System and Method for Raising the Same" and having common inventors with the present application.

Chronis, Nicholas P.; Mechanisms & Mechanical Devices Sourcebook, 1991, Ch. 10, pp. 399-414, ISBN 0-07-010918-4, McGraw-Hill, Inc.

* cited by examiner

SYSTEM AND METHOD FOR RAISING AND LOWERING A DRILL FLOOR MOUNTABLE AUTOMATED PIPE RACKING SYSTEM

TECHNICAL FIELD OF INVENTION

The present invention relates to a new apparatus and method for use in subterranean exploration. The present invention provides a system and method for rapid rig-up and rig-down of a mechanism that is mountable to a drill floor of a conventional drilling rig, such as a pipe racking mechanism. Still more particularly, the present invention discloses an apparatus and method for rapid deployment of a drill floor mounted pipe racking system during rig-up at a new drilling location.

BACKGROUND OF THE INVENTION

In the exploration of oil, gas and geothermal energy, drilling operations are used to create boreholes, or wells, in the earth. Subterranean drilling necessarily involves the movement of long lengths of tubular sections of pipe. At various intervals in the drilling operation, all of the drill pipe must be removed from the wellbore. This most commonly occurs when a drill bit wears out, requiring a new drill bit to be located at the end of the drill string. It can also be necessary to reconfigure the bottom-hole assembly or replace other downhole equipment that has otherwise failed. When the drill pipe has to be removed, it is disconnected at every second or third connection, depending on the height of the mast. On smaller drilling rigs used in shallower drilling, every other connection is disconnected, and two lengths of drill pipe, known as "doubles," are lifted off of the drill string, aligned in the fingers of the rack by the derrickman, and then lowered onto the drill floor away from the well center. On larger drilling rigs used for deeper drilling, every third connection is disconnected and three lengths of pipe, known as "triples," are lifted off of the drill string, aligned in the fingers of the rack by the derrickman, and then lowered onto the drill floor away from the well center. The doubles and triples are called a stand of pipe. The stands are stored vertically on the rig floor, aligned neatly between the fingers of the rack on the mast. A triple pipe stand is long and thin (about ninety feet long).

Removing all of the drill pipe from the well and then reconnecting it to run back into the well is known as "tripping the pipe" or "making a trip," since the drill bit is making a round trip from the bottom of the hole to the surface and then back to the bottom of the hole. Tripping the drill pipe is a very expensive and dangerous operation for a drilling rig. Most injuries that occur on a drilling rig are related to tripping the pipe. Additionally, the wellbore is making no progress while the pipe is being tripped, so it is downtime that is undesirable. This is why quality drill bits are critical to a successful drill bit operation. Drill bits that fail prematurely can add significant cost to a drilling operation. Since tripping pipe is "non-drilling time," it is desirable to complete the trip as quickly as possible. Most crews are expected to move the pipe as quickly as possible.

There are a number of variables that contribute to a very irregular and hostile movement of the pipe stand as it is disconnected and moved to the rack for setting on the drill floor, as well as when it is being picked up for alignment over the wellbore center for stabbing and connection to the drill string in the wellbore. For example, the vertical alignment and travel of the elevator and hoist connection which lift the drill string from the wellbore is cable connected and capable of lateral movement which is translated to the drill string rising from the wellbore. Also, the drill string is supported from the top, and as the derrickman moves the drill string laterally, the accelerated lateral movement of the long length of the pipe stand away from the well center generates a wave form movement in the pipe itself. As a result of the natural and hostile movement of the heavy drill stand, which typically weighs between 1,500 and 2,000 lbs., and drill collars which weigh up to 20,000 lbs., it is necessary for the crew members to stabilize the drill pipe manually by physically wrestling the pipe into position. The activity also requires experienced and coordinated movement between the driller operating the drawworks and the derrickman and floorhands. Many things can go wrong in this process, which is why tripping pipe and pipe racking is a primary safety issue in a drilling operation.

Attempts have been made to mechanize all or part of the pipe racking operation. On offshore platforms, where funding is justifiable and drill floor space is available, large Cartesian racking systems have been employed in which the drill stands are gripped at upper and lower positions to add stabilization, and tracked modules at the top and bottom of the pipe stand coordinate the movement of the pipe stand from the wellbore center to a racked position. Such systems are very large and very expensive, and are not suitable for consideration for use on a traditional land based drilling rig.

An attempt to mechanize pipe racking on conventional land based drilling rigs is known as the Iron Derrickman® pipe-handling system. The apparatus is attached high in the mast, at the rack board, and relies on a system of hydraulics to lift and move stands of drill pipe and collars from hole center to programmed coordinates in the racking board. This cantilever mast mounted system has a relatively low vertical load limit, and therefore requires assistance of the top drive when handling larger diameter collars and heavy weight collars.

The movement of the pipe with this system has proved unpredictable and thus requires significant experience to control. One problem with this system is that it grips the pipe far above the center of gravity of the tubular and fails to control the hostile movement of the drill pipe stand sufficiently to allow for safe handling of the stands or for timely movement without the intervention of drilling crew members. In particular, the system is not capable for aligning the lower free end of the drill stand accurately for stabbing into the drill string in the wellbore without frequent human assistance. As a result of these and other deficiencies, the system has had limited acceptance in the drilling industry.

An alternative system that is known provides vertical lifting capacity from the top drive and a lateral movement only guidance system located near the rack. The system still requires a floorman for stabbing the pipe to the stump as well as to the set-back position.

A primary difficulty in mechanizing pipe stand racking is the hostile movement of the pipe that is generated by stored energy in the stand, misaligned vertical movement, and the lateral acceleration and resultant bending and oscillation of the pipe, which combine to generate hostile and often unpredictable movements of the pipe, making it hard to position, and extremely difficult to stab.

A conflicting difficulty in mechanizing pipe stand racking is the need to move the pipe with sufficient rapidity that cost savings are obtained over the cost of manual manipulation by an experienced drilling crew. The greater accelerations required for rapid movement store greater amounts of energy in the pipe stand, and greater attenuated movement of the stand.

Another primary obstacle in mechanizing pipe stand racking is the prediction and controlled management of the pipe stand movement sufficient to permit the precise alignment required for stabbing the pipe to a first target location on the drill floor and to a second target location within the fingers of the racking board.

An even greater obstacle in mechanizing pipe stand racking is the prediction and controlled management of the pipe stand movement sufficient to achieve the precise alignment required for stabbing the tool joint of the tubular held by the racking mechanism into the receiving tubular tool joint connection extending above the wellbore and drill floor.

Another obstacle to land-based mechanizing pipe stand racking is the lack of drilling floor space to accommodate a railed system like those that can be used on large offshore drilling rigs, as well as the several structural constraints that are presented by the thousands of existing conventional drilling rigs, where the need to retrofit is constrained to available space and structure.

A recent solution to these several obstacles is disclosed in U.S. patent application Ser. No. 13/681,244. This solution provides a relatively large and complex pipe racking mechanism that must be stability erected on the top of a conventional drill floor of a land based drilling rig, where it must also be connected securely to the mast of the drilling rig.

Thus, the best technology for an automatic pipe racking solution creates a significant related obstacle in the transportation and rig-up and rig-down of such a large system. A first obstacle is to efficiently reduce such a large structure into a transportable envelope. A second obstacle is to accomplish the conversion from a truck mounted transportable load to a rigged-up position using the existing equipment for positioning and raising the mast and substructure of the conventional drilling rig.

It is also desirable to minimize accessory structure and equipment, particularly structure and equipment that may interfere with transportation or with manpower movement and access to the rig floor during drilling operations, or that will unreasonably extend the time needed to erect the drilling rig. It is also desirable to ergonomically limit the manpower interactions with rig components during rig-up for cost, safety and convenience.

Thus, the currently best known solution for automatic pipe racking problems presents unique challenges of rig-up, rig-down and transportation.

The various embodiments of the present invention provide for a system and method of efficient rig-up, rig-down and transportation of a drill floor mountable automatic pipe racking device capable of use on a conventional land based drilling rig floor.

SUMMARY OF THE INVENTION

The present invention provides a new and novel pipe stand racking system and method of use. In one embodiment, an automatic pipe racker is provided, having a base frame connectable to a drill floor of a drill rig and extending upwards at a position offset to a V-door side of a drilling mast that is also connected to the drill floor. In one embodiment, the base frame is a C-frame design. A mast brace may be connected between the base frame and the drilling mast at a position distal to the drill floor for stabilizing an upper end of the base frame in relationship to the mast. A tensioner may be connected between the base frame and the drilling floor for stabilizing the base frame in relationship to the substructure.

The base frame is connectable to the drill floor of a drill rig, in a position offset to the drilling mast. A pair of base legs is pivotally connected to the base frame, and movable between a retracted position for transportation and an extended position for pivotal connection to the drill floor. A pipe handling mechanism is extendable from the base frame, and capable of moving stands of connected pipe from a racked position on the drill floor to a stabbing position above a drill string component held in a rotary table.

Besides the base frame, the pipe stand racking system may include components such as a lateral extend mechanism connected to the base frame, and extendable between a retracted position and a deployed position. The pipe handling mechanism may further include a rotate mechanism connected to the lateral extend mechanism, and being rotatable in each of the left and right directions. A finger extend mechanism may further be connected to the rotate mechanism, being laterally extendable between a retracted position and a deployed position.

A vertical grip and stab mechanism may be attached to the finger extend mechanism. The gripping mechanism has grippers to hold a tubular pipe or stand of pipe and is capable of moving the pipe vertically to facilitate stabbing.

The automatic pipe racking system is series nested and substantially retractable into the base frame. This property transforms the automatic pipe stand racking system into a structure having a transportable envelope.

In another embodiment, a system is provided for transportation and erection of an automated pipe racker, comprising a base frame connectable to a drill floor of a drill rig, offset to a drilling mast that is also connected to the drill floor. A pair of legs is retractably connected to the base frame, and movable between a retracted position for transportation and an extended position for connection to the drill floor. A mast brace is connectable between the base frame and the drilling mast. A skid assembly is connected to the base frame. The skid assembly is designed to be a platform on which the automatic pipe racker rests during transportation.

In one embodiment, the skid assembly is tiltable to facilitate connection to the drill floor for rig-up. In this embodiment, the skid assembly has an upper skid and a lower skid, with the lower skid pivotally connected to the base frame and movable between an extended position for transportation and a retracted position for connection of the automatic pipe racker to the drill floor for rig-up.

In another embodiment, a retractable standoff is located between the base frame and lower skid. An optional retractable latch may be provided to lock or unlock the position of the lower skid in relation to the base frame. A jack may be provided and located proximate to the upper skid. The jack is extendable to tilt the automatic pipe racker onto the lower skid when the lower skid is in the retracted position.

A ground pivot point is located near the center of gravity of the automated pipe racker when the automatic pipe racker is resting on the skid assembly. The upper skid portion extends substantially (mostly) above the ground pivot. The lower skid portion extends substantially (mostly) below the ground pivot. The ground pivot is located in between the lower and upper skids. In another embodiment, the ground pivot is located near and below the center of gravity of the automated pipe racker when the automatic pipe racker is resting on the skid assembly, such that the automatic pipe racker will rest on the upper skid when the skid is resting on a substantially (mostly) horizontal plane.

As will be understood by one of ordinary skill in the art, the sequence of the steps, and designation of retractable elements disclosed may be modified and the same advantageous result obtained. For example, the functions of the upper and lower skids may be reversed, and other certain elements may be deployed before or after other elements where minor change in sequence does not change the result.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
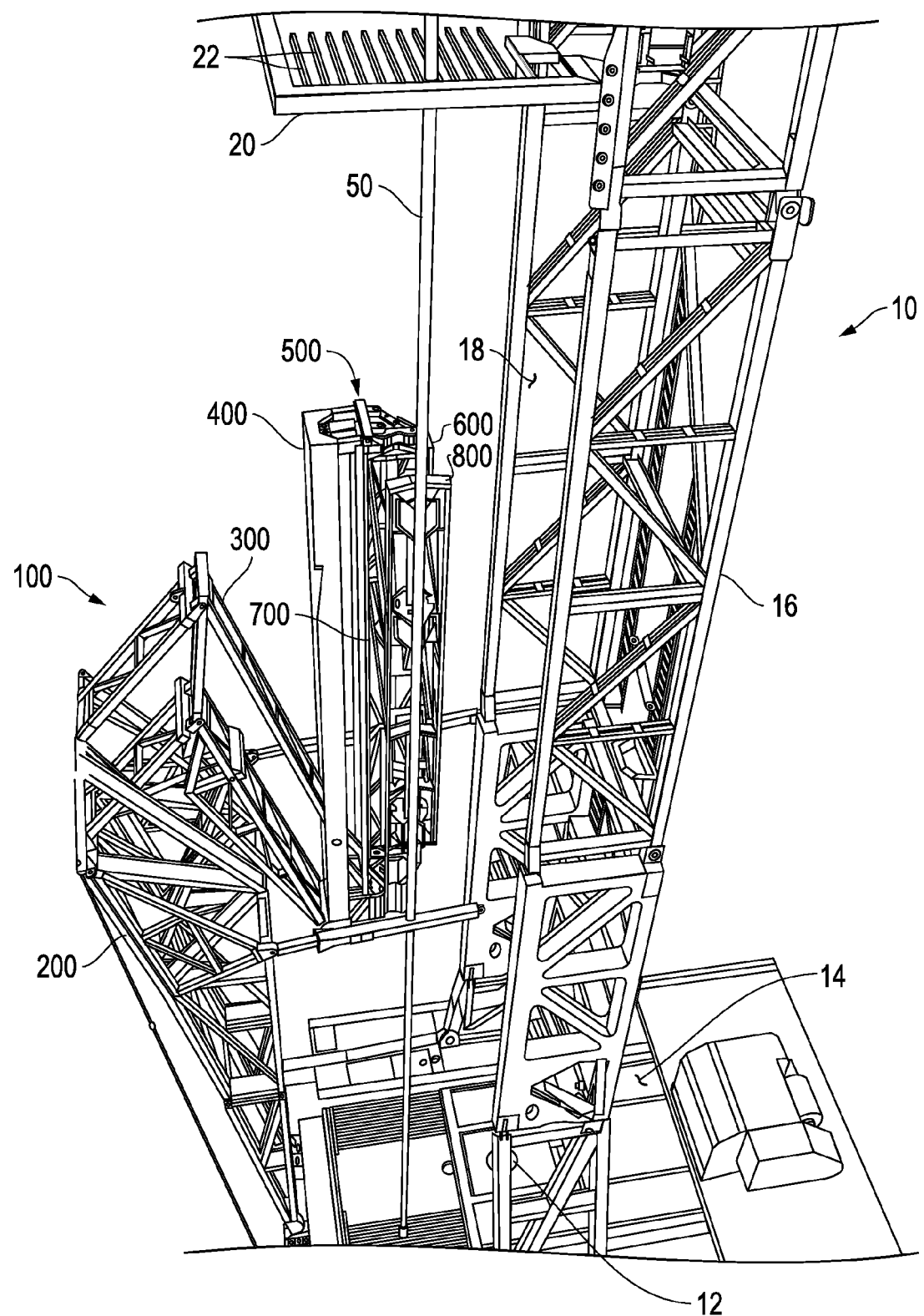
FIG. 1 is an isometric view of a drilling rig fitted with an automatic pipe racking system of the type to which the present invention applies.

FIG. 1 is an isometric view of an automatic pipe racking mechanism 100 including features of the invention disclosed in U.S. patent application Ser. No. 13/681,244, and which embodies a drill floor mounted structure of the type to which the present inventive system and method of raising applies. Drilling rig 10 has a drill floor 14 located over a wellbore 12. A drilling mast 16 is mounted to drill floor 14, which has an open V-door side 18. Racking mechanism 100 is mounted on drill floor 14, on the V-door side 18 of drilling mast 16.

Racking mechanism 100 is comprised of a base frame 200 that is pivotally connected to drill floor 14 by floor pins 202. In one embodiment, base frame 200 is a tapered C-frame that extends upwards from drill floor 14 at a position offset to V-door side 18 of drilling mast 16. A pipe handling mechanism 800 is extendable from base frame 200, and capable of moving stands of connected pipe 50 from a racked position on drill floor 14 to a stabbing position above a drill string component held in a rotary table. A mast brace 204 is connected between base frame 200 and drilling mast 16 at a position distal to drill floor 14 for stabilizing an upper end of base frame 200 in relationship to drilling mast 16. In one embodiment, a pair of tensioning members 206 is connected between drill floor 14 and base frame 200.

In one embodiment, the length of mast brace 204 is controllably adjustable to compensate for deflection of racking mechanism 100 under different payloads which vary with the size of the tubular being handled. Adjustment is also advantageous to accommodate non-verticality and settling of drilling rig 10. Adjustment is also useful for connectivity to other mechanisms that deliver or receive pipe from racking mechanism 100. Adjustment is also useful when using mast braces 204 as a connected lifting component of the present raising system.

Figure 2:
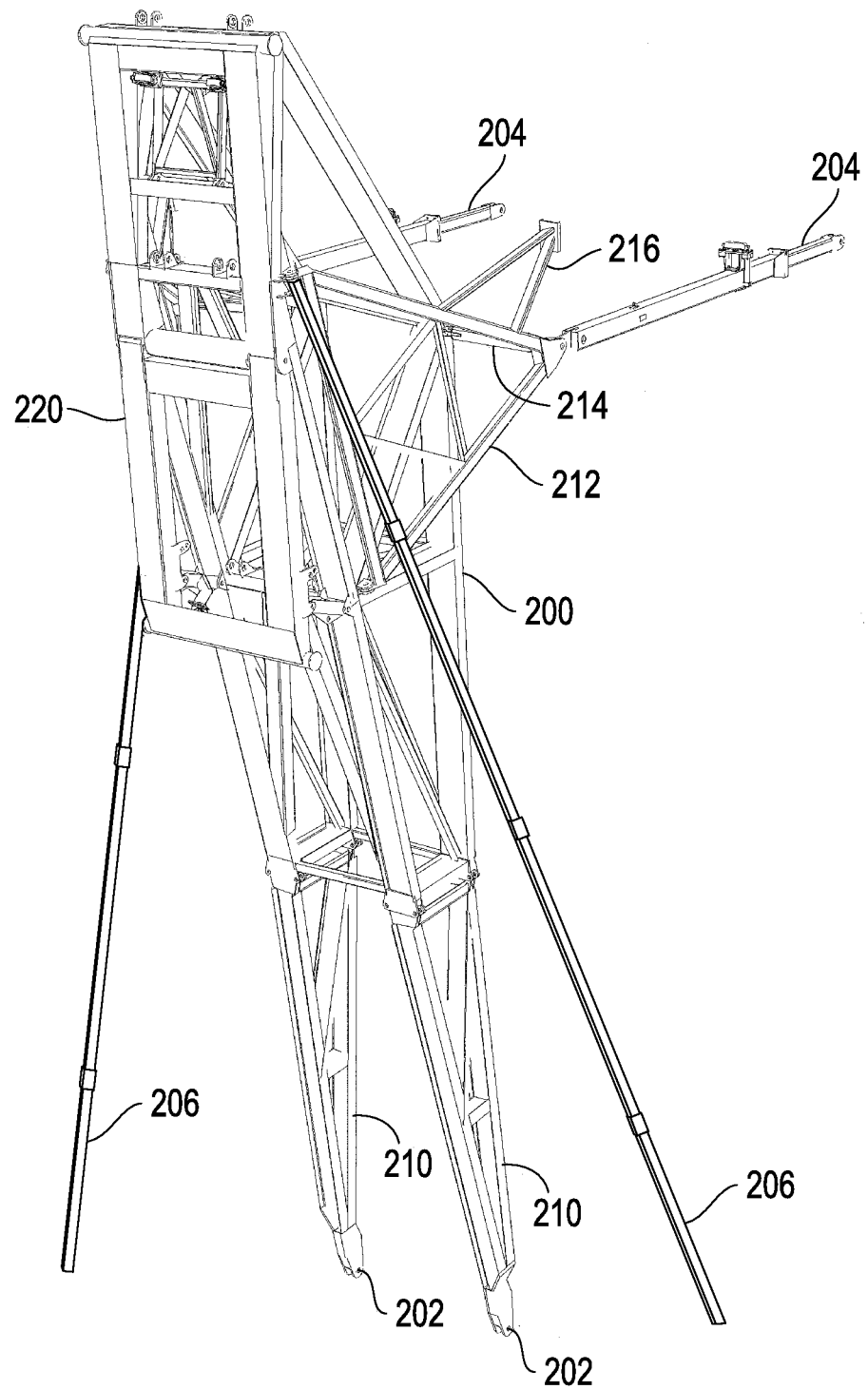
FIG. 2 is an isometric view of the automatic pipe racking mechanism, illustrated without the drilling rig, and showing a skid assembly mounted to the back side of the pipe racker.

FIG. 2 is an isometric view of base frame 200 of racking mechanism 100, illustrating base frame 200 in isolation of the remaining components of racking mechanism 100 and of drilling rig 10. In one embodiment, base frame 200 includes a pair of deployable legs 210 pivotally connectable at a lower end of base frame 200. When legs 210 are deployed downward, deployed ends of legs 210 are connected to drill floor 14 (not shown) by floor pins 202. Retraction of legs 210 provides a shorter transport profile for transporting racking mechanism 100 between drilling sites.

Base frame 200 also includes a pair of deployable arms 212, pivotally attached to base frame 200. In one embodiment, when arms 212 are deployed outward, deployed ends of arms 212 are connected to base frame 200 by struts 214. In this embodiment, mast braces 204 are pivotally connected to the ends of arms 212, and pivotally connectable to mast 16. This connectivity increases the spacing between mast braces 204 and mast 16, providing conflict free mechanical operation of racking mechanism 100. Retraction of arms 212 and pivotal retraction of braces 204 provides a narrower transport profile for transporting racking mechanism 100 between drilling sites. In another embodiment (best seen in FIG. 3), legs 210, arms 212 and braces 204 fully retract without structural interference, such that each retracts proximate to base 200 for greater transportability. As shown in the present embodiment of base frame 200, an optional bracket 216 may be provided for supporting mast braces 204 during transport of base frame 200. Bracket 216 may be attached to struts 214 or mast braces 204 to secure these elements to the mast braces 204 during transport.

Base frame 200 has a skid assembly 220 attached to the side opposite mast 16. In another embodiment, tensioning members 206 connect each side of base frame 200 to drill floor 14 (not shown) of drilling rig 10 (not shown). Tensioning members 206 stabilize base frame 200 of racking mechanism 100. In one embodiment, tensioning members 206 are adjustable to stiffen racking mechanism 100, and to compensate for verticality and the variable deflection of racking mechanism 100 when handling different sizes of drill pipe 50.

It will be appreciated that the disclosed invention, or a similar automatic pipe racking system, must be capable of rapid disassembly and assembly. In contemporary drilling operations, it is necessary to minimize the downtime of the drilling rig and to "rig down" or disassemble the entire drilling rig to a minimum number of transportable components as quickly as possible. The transportable components must fit within regulated physical dimensions for safe transport on designated highways to remote locations where the drilling activity can resume.

Figure 3:
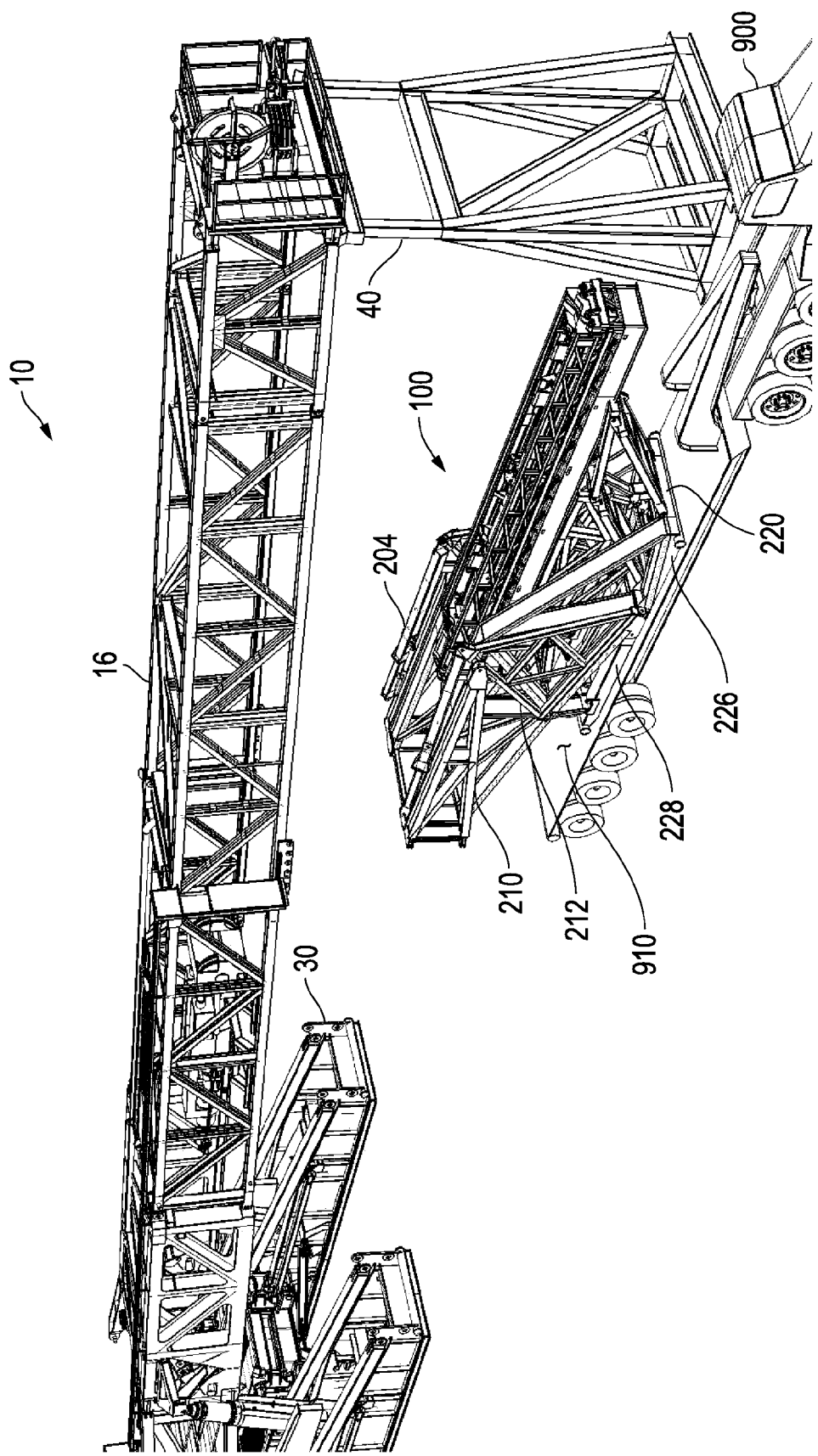
FIG. 3 is an isometric representation of a transport vehicle transporting an automatic pipe racker to a position in alignment beneath the mast connected to the substructure. The transport vehicle is aligned for approach to the collapsed substructure.

FIG. 3 is an isometric representation of a transport vehicle 900 transporting racking mechanism 100 to a position in alignment beneath mast 16. Drilling rig 10 has its mast 16 assembled but not raised. Mast 16 is pivotally connected to a substructure 30 that is also not raised. In the embodiment illustrated, mast 16 is optionally supported by a rack, such as a headache rack 40 for safety. In the embodiment illustrated in this view, base frame 200 has a skid assembly 220 attached.

Skid assembly 220 supports racking mechanism 100 on transport vehicle 900. During transportation, and as illustrated here, lower skid 228 and upper skid 226 support racking mechanism 100 on the trailer bed 910 of transport vehicle 900. Transport vehicle 900 is maneuvered to position racking mechanism 100 beneath mast 16. Alternatively, racking mechanism 100 may be placed on the ground on top of skid assembly 220 and positioned into place with equipment such as a fork lift.

Figure 4:
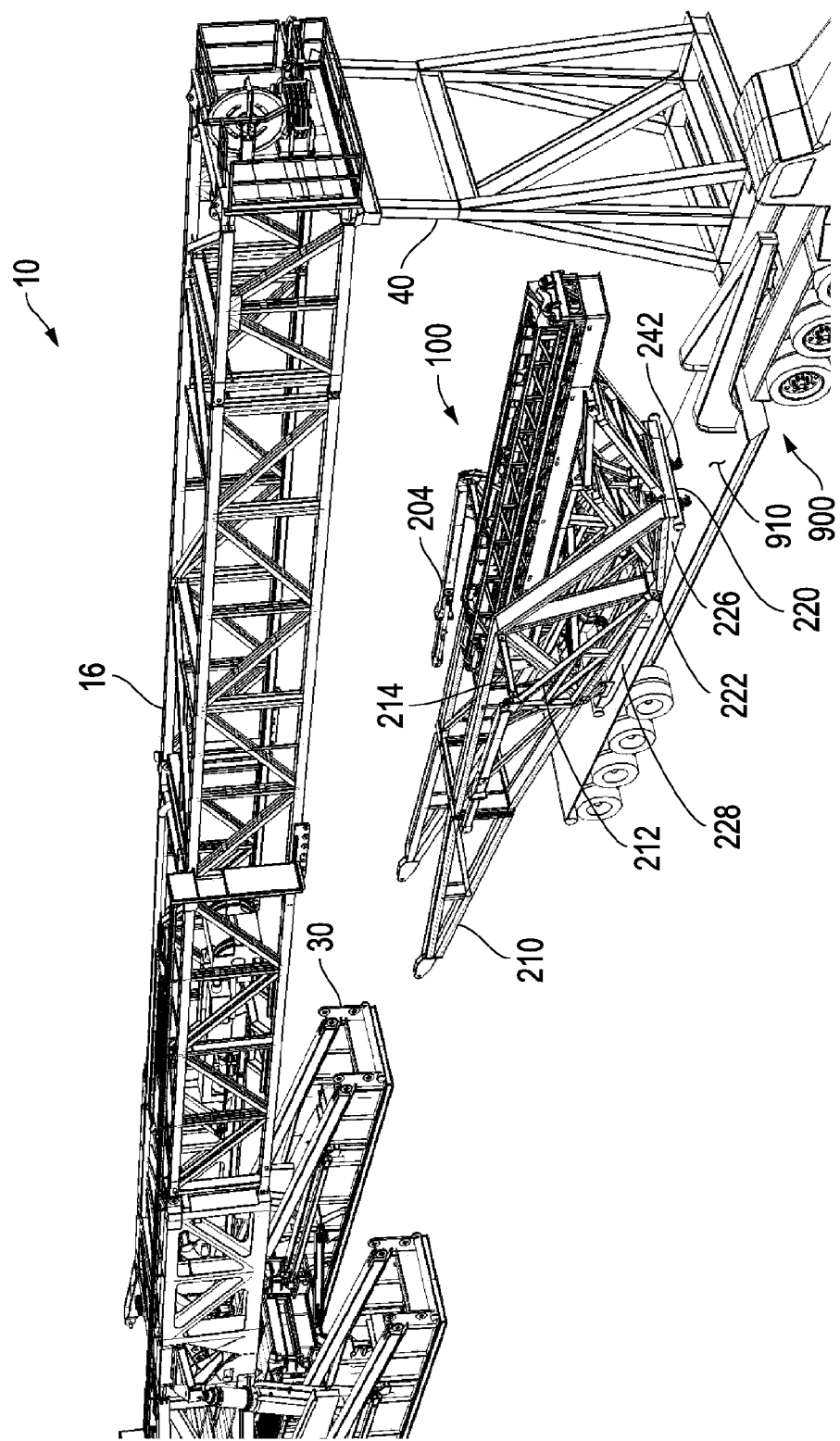
FIG. 4 is a continuation of the rig-up process illustrated in FIG. 3, illustrating deployment of components of the automatic pipe racking system that were previously retracted for transportation.

FIG. 4 is a continuation of the rig-up process illustrated in FIG. 3, illustrating deployment of components of racking mechanism 100 that were previously retracted for transportation as shown in FIG. 3. In particular, arms 212, mast braces 204, and legs 210 have been deployed. Optionally, when arms 212 are deployed outward, deployed ends of arms 212 may be connected to base frame 200 by struts 214 to further strengthen their position.

Also illustrated in FIG. 4, lower skid 228 has been retracted, and a jack 240 (FIG. 6) has been actuated to tilt racking mechanism 100 backwards over pivot center 222 such that racking mechanism 100 is resting on retracted lower skid 228. Upper skid 226 no longer supports the weight of racking mechanism 100, as the center of gravity 224 of racking mechanism 100 has shifted below pivot center 222.

In an optional embodiment, wheel assembly 242 is deployed when jack 240 is actuated to facilitate minor realignment of racking mechanism 100 relative to drill floor 14 as may be necessary.

Figure 5:
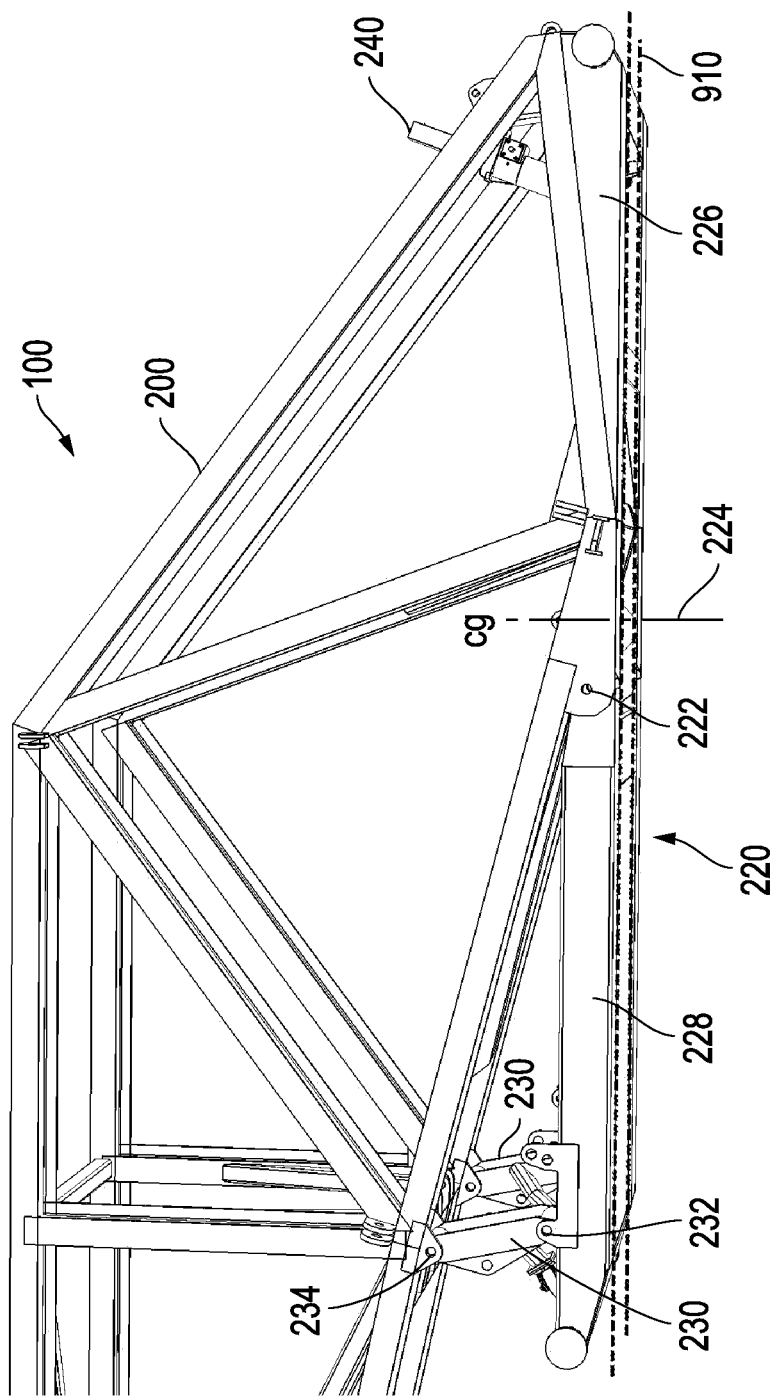
FIG. 5 is a general side view of an optional embodiment, illustrating the automatic pipe racker resting on its skid assembly, in the transport position on the trailer bed of a truck.

FIG. 5 is a close-up side view, illustrating the automatic pipe racking mechanism 100 resting on skid assembly 220 in the transport position on trailer bed 910 of a transport vehicle 900.

In the embodiment illustrated, skid assembly 220 has a skid ground pivot 222 located proximate to where lower skid 228 is pivotally connected to base frame 200. Ground pivot 222 is also located near the center of gravity 224 of racking mechanism 100 when the automatic pipe racking mechanism 100 is resting on skid 220. In this embodiment, an upper skid portion 226 extends above ground pivot 222, and lower skid portion 228 extends below ground pivot 222.

In this transport position, both lower skid 228 and upper skid 226 are in contact with trailer bed 910 of transport vehicle 900. This configuration provides for stability during transport, as both lower skid 228 and upper skid 226 support the weight of racking mechanism 100 as transport vehicle 900 accelerates, decelerates and navigates turns, shifting the weight of racking mechanism 100 on trailer bed 910.

In the embodiment illustrated, one or more skid stand-offs 230 are pivotally connected to lower skid portion 228 at pivot 232. Retractable stand-offs 230 are pivotally connected to base frame 200 at pivots 234. Stand-offs 230 hold lower skid 228 in the deployed position. Also seen in the embodiment illustrated, an optional jack 240 is located proximate to the upper end of upper skid 226, opposite to the ground pivot 222 end of upper skid 226.

Figure 6:
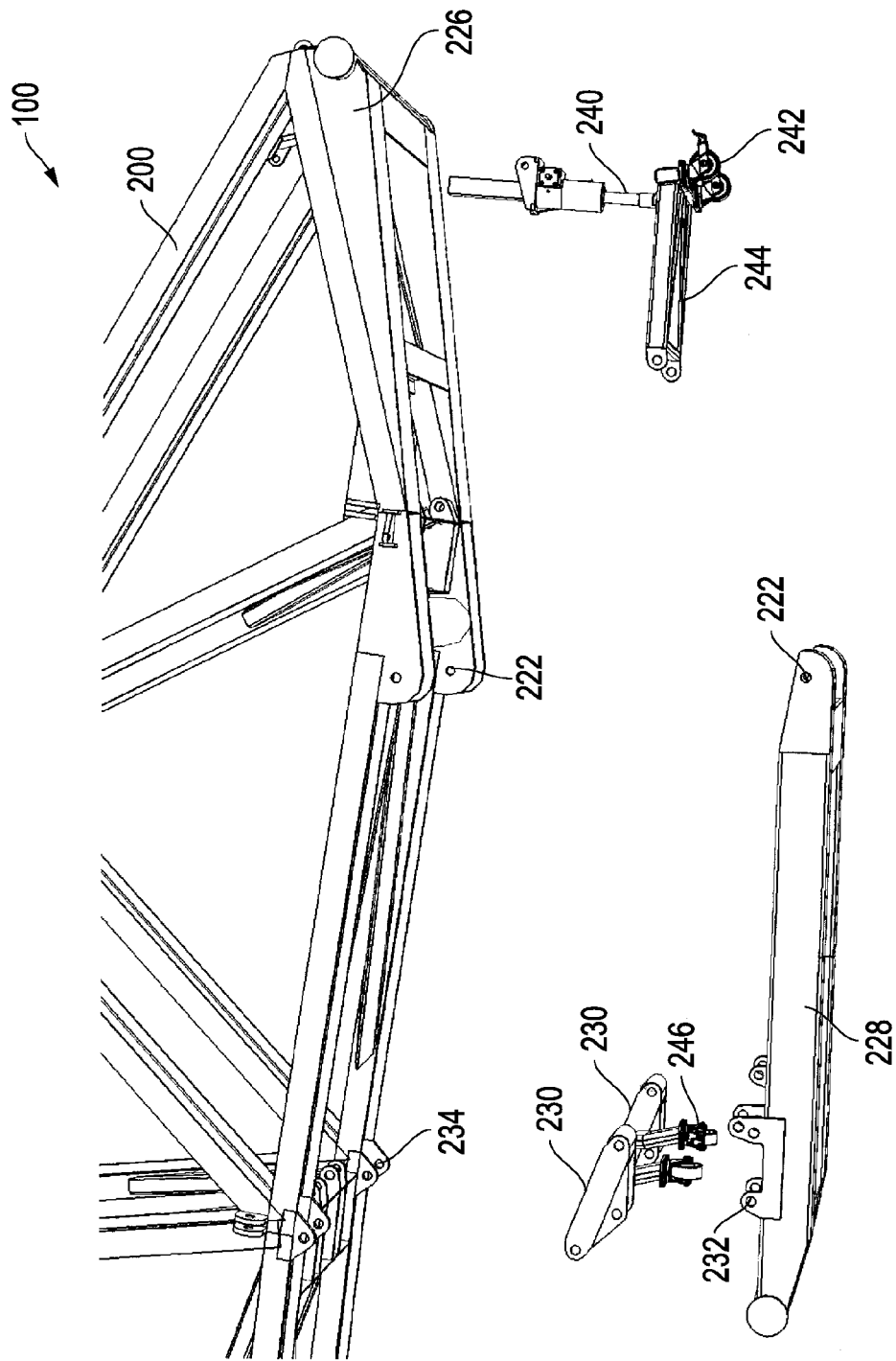
FIG. 6 is a general side view of the base frame of the pipe racker, including an exploded view of a skid assembly normally connected to the base frame.

FIG. 6 is a general side view of the lower portion of base frame 200, including an exploded view of skid assembly 220 in accordance with an embodiment of the present invention. In this view, upper skid 226 is shown attached to base frame 200. Lower skid 228 is shown detached from pivot 222. Stand-offs 230 are shown having wheels 246 attached, which are mostly hidden from view in the other figures.

To transition racking mechanism 100 to a rig-up position, stand-offs 230 are moved from the extended position to the retracted position, causing lower skid 228 to retract into proximity with base frame 200. In the embodiment illustrated, this movement exposes wheels 246 beneath lower skid 228. This will permit wheels 246 to engage trailer bed 910 to facilitate corrective alignment of racking mechanism 100 with drill floor 14 and mast 16 if such alignment is necessary. Such engagement will occur in the next step of tilting.

Still referring to FIG. 6, a jack 240 is attached to a jack frame 244 having a wheel assembly 242 attached. To transition racking mechanism 100 to a rig-up position, jack 240 may be actuated, causing racking mechanism 100 to tilt onto wheels 242 of retracted lower skid 228. In the embodiment illustrated, extension of jack 240 exposes wheel assembly 242 beneath upper skid 226. This permits wheels 246 to engage trailer bed 910 to facilitate corrective alignment of racking mechanism 100 with drill floor 14 and mast 16 if such alignment is necessary.

Figure 7:
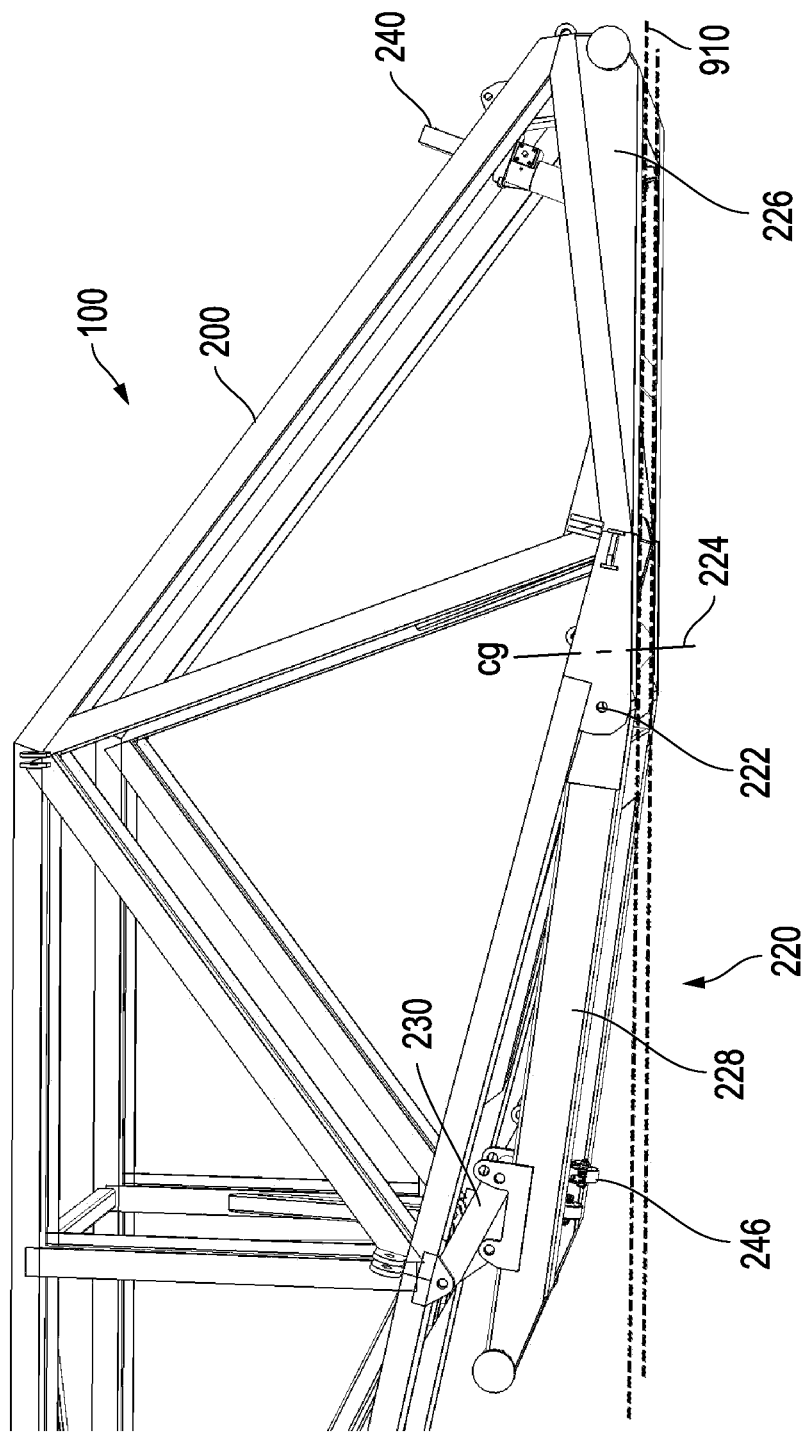
FIG. 7 is a general side view, illustrating the automatic pipe racker resting on its skid, with the skid assembly shown transitioning into the rig-up position.

FIG. 7 is a general side view, illustrating the automatic racking mechanism 100 resting on skid assembly 220, with skid assembly 220 shown transitioning from the transport position to the rig-up position. In this intermediate step, stand-offs 230 are retracted, which retracts lower skid 228 about pivot 222 to a position closer to base frame 200. Since center of gravity 224 is located on the upper skid 226 side of ground pivot 222, racking mechanism 100 does not tip uncontrollably onto wheels 246 of lower skid 228.

Figure 8:
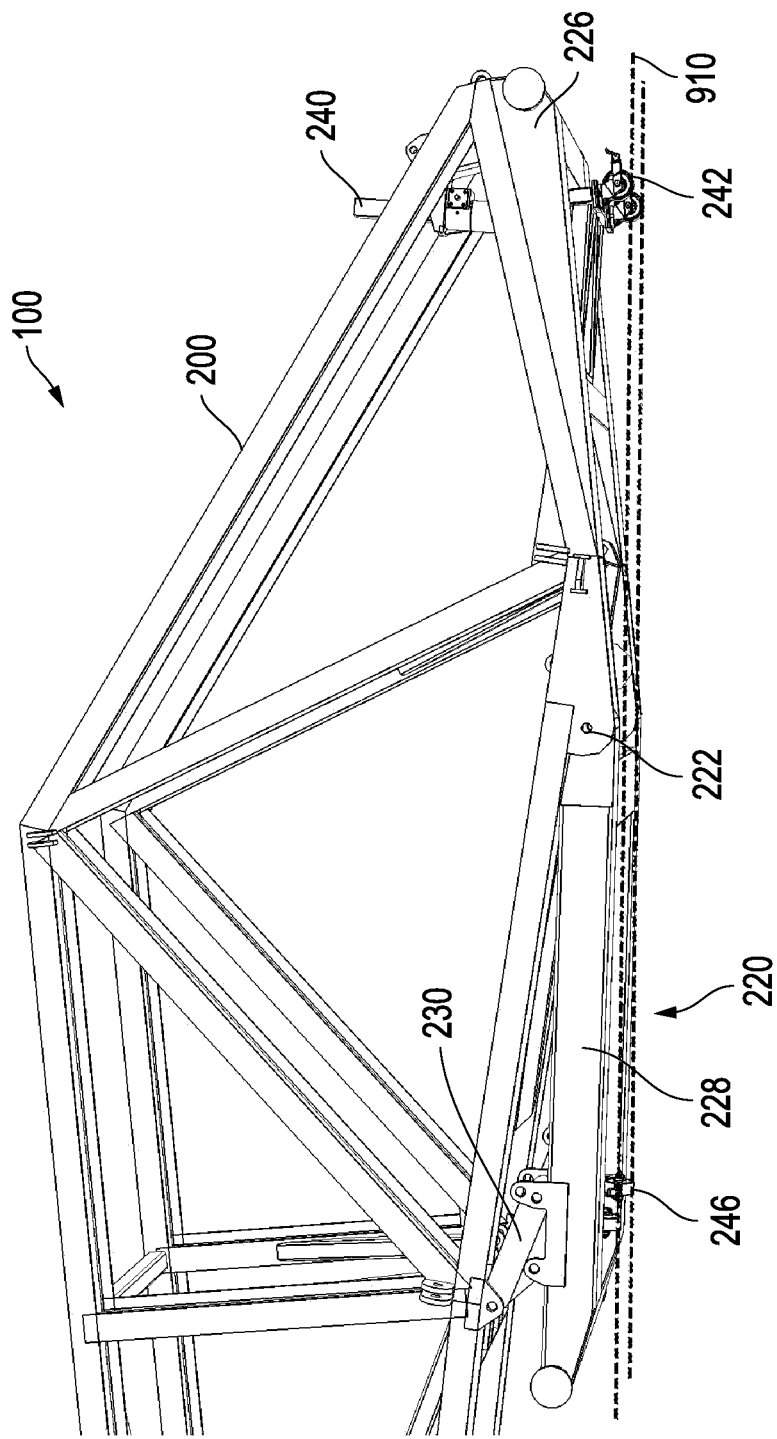
FIG. 8 is a general side view, illustrating the automatic pipe racker resting on its skid, with the skid assembly shown in the rig-up position.

FIG. 8 is a general side view, illustrating automatic racking mechanism 100 resting on skid assembly 220, with skid assembly 220 shown in the rig-up position. Jack 240 has been actuated so as to tilt racking mechanism 100 rearward until wheels 246 of lower skid 228 contact trailer bed 910. Additionally, wheel assembly 242 comes into engagement with trailer bed 910 to further facilitate corrective alignment of racking mechanism 100 with drill floor 14 and mast 16 if such alignment is necessary.

Figure 9:
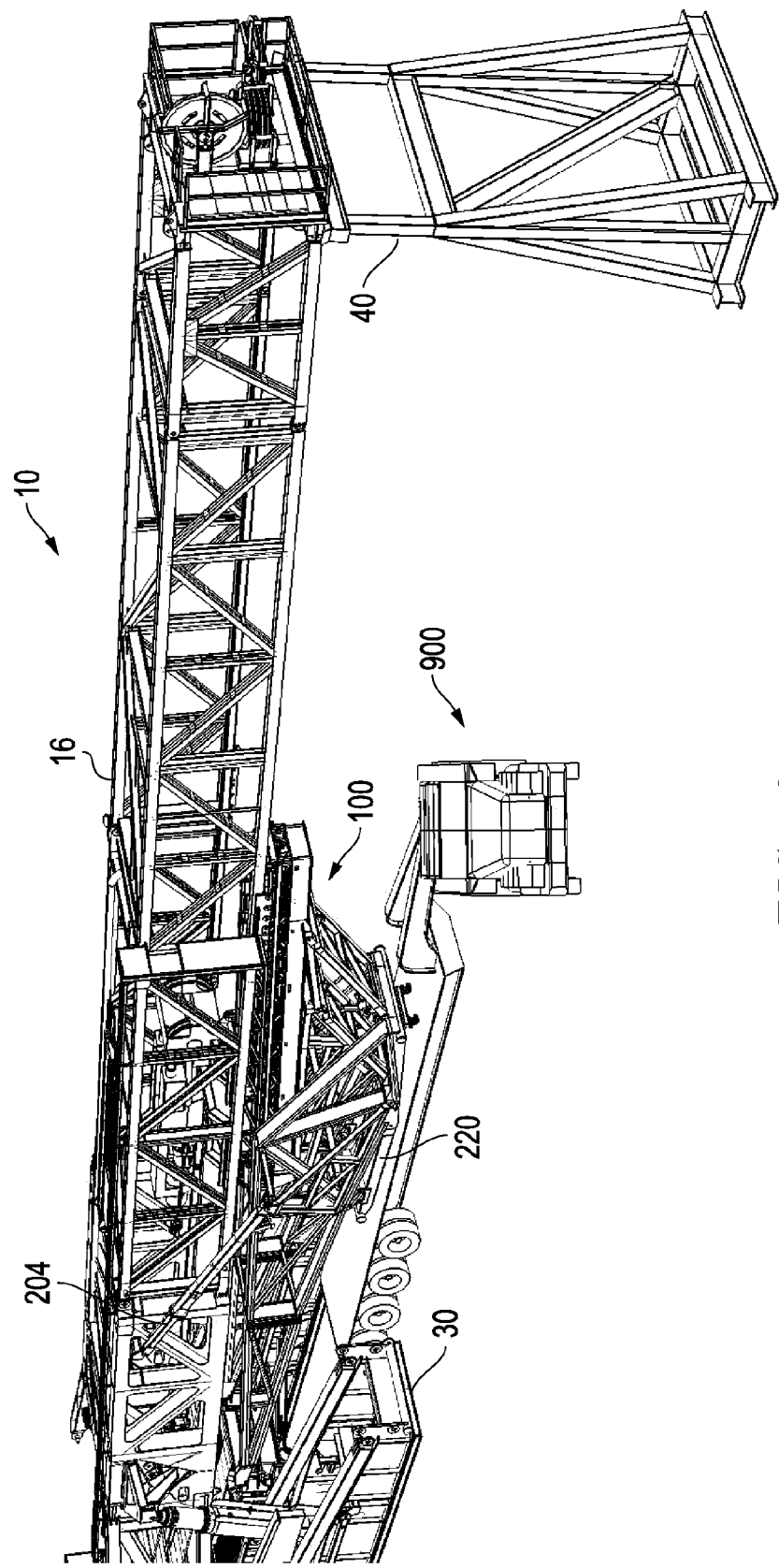
FIG. 9 is a continuation of the rig-up process illustrated in FIG. 4, illustrating movement of the transport vehicle closer to the substructure, tilting the automatic pipe racking system on the transport trailer bed, and connection of deployed components of the automatic pipe racking system to the drill floor and mast.

FIG. 9 is a continuation of the rig-up process illustrated in FIG. 4, and as illustrated in FIGS. 5-8. FIG. 9 illustrates movement of transport vehicle 900 into position closer to substructure 30. Tilted automatic racking mechanism 100 on transport trailer bed 910 is now in position for connection of the deployed components of racking mechanism 100 to drill rig 10.

As seen in FIG. 9, by tilting racking mechanism 100, racking mechanism 100 is now positioned such that legs 210 extend appropriately over drill floor 14 to align legs 210 for pivotal connection to drill floor 14 with floor pins 202. Mast braces 204 may also be pivotally connected to mast 16 in this position. Optionally, a pair of tensioning members 206 are connected between drill floor 14 and base frame 200. Tensioning members 206 further stabilize base frame 200 in relationship to drilling rig 10. Alternatively, tensioning members 206 may be connected after raising automatic pipe racking mechanism 100. Optionally, a frame support 40 such as the headache rack, can be positioned underneath mast 16 for safety.

Figure 10:
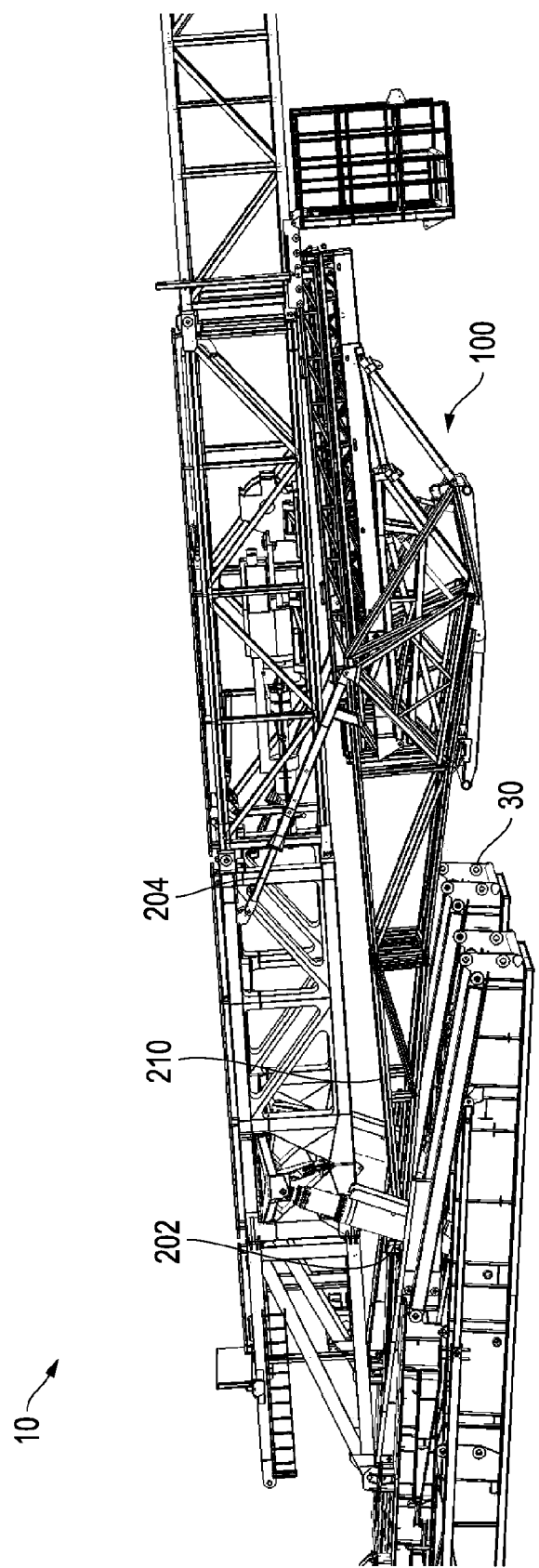
FIG. 10 is a continuation of the rig-up process illustrated in FIG. 9, illustrating the removal of the transport vehicle from beneath the mast, and with the automatic pipe racking system supported by its connection to the drill floor and the drill mast.

FIG. 10 is a continuation of the rig-up process illustrated in FIGS. 3-9. FIG. 10 illustrates transport vehicle 900 removed from beneath mast 16, and racking mechanism 100 remains suspended by its connections to drill rig 10. When transport vehicle 900 departs, the racking board 20 can be attached to the mast 16 as shown.

Figure 11:
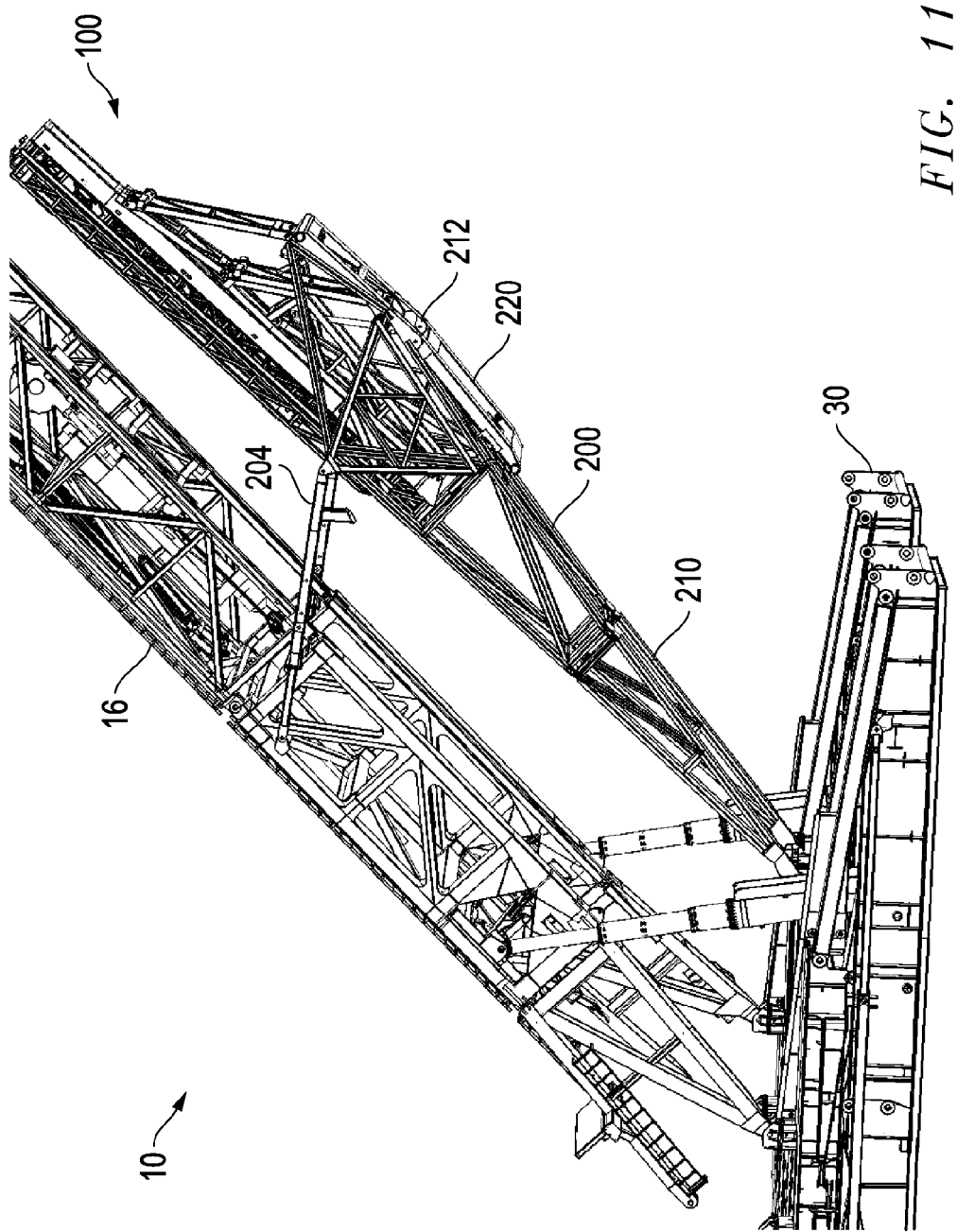
FIG. 11 is a continuation of the rig-up process illustrated in FIG. 10, illustrating partial raising of the mast and automatic pipe racking system to a position above the drill floor.

FIG. 11 is a continuation of the rig-up process illustrated in FIGS. 3-10, illustrating partial raising of mast 16 and automatic pipe racking mechanism 100 towards a vertical position over drill floor 14. This step is conventionally performed by extension of hydraulic cylinders sized for the task. As mast 16 is raised, automatic pipe racking mechanism 100 is pulled into position by mast braces 204 through arms 212, pivoting automatic pipe racking mechanism 100 on the pivotal connection 202 of legs 210 to drill floor 14 at floor pins 202. Tensioning members 206 are not shown connected between automatic pipe racking mechanism 100 and drill floor 14, but they may be connected at this time as well.

Figure 12:
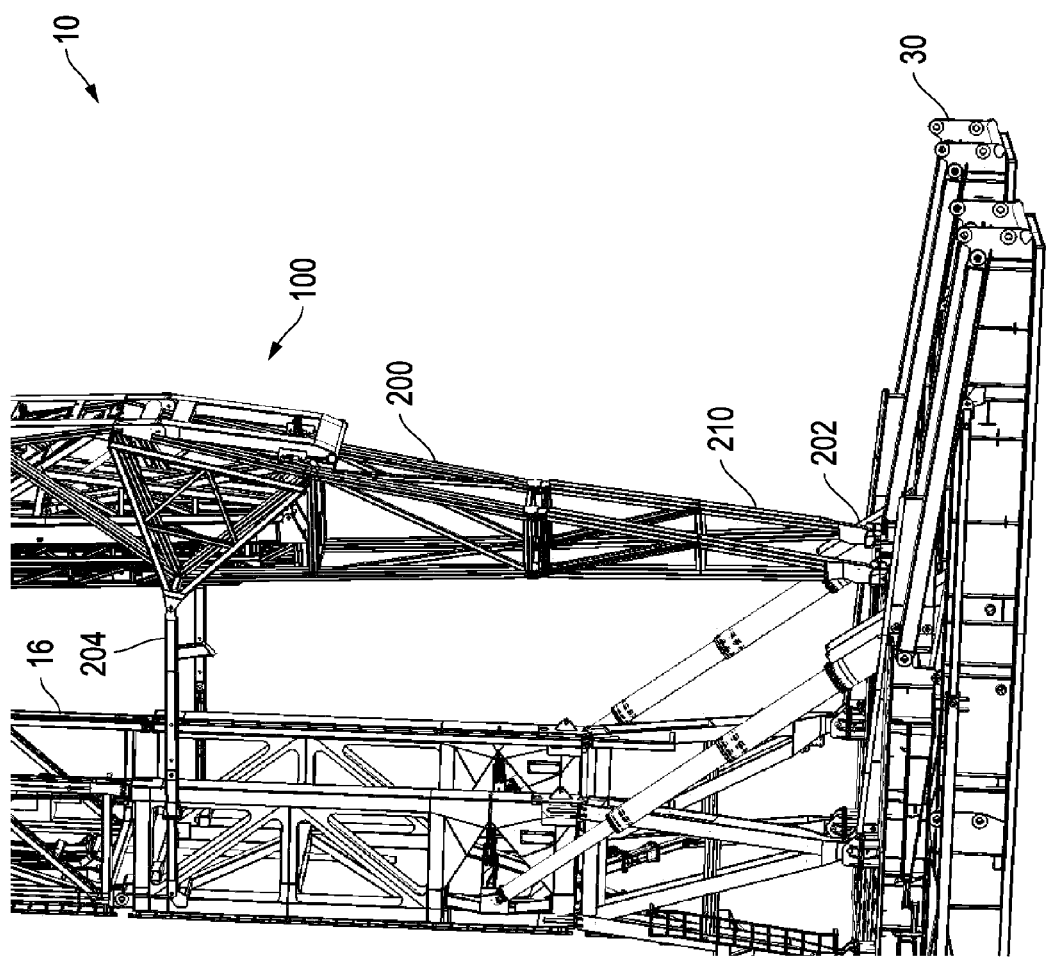
FIG. 12 is a continuation of the rig-up process illustrated in FIG. 11, illustrating the mast and automatic pipe racking system in the vertical position above the drill floor.

FIG. 12 is a continuation of the rig-up process illustrated in FIGS. 3-11, illustrating mast 16 and automatic pipe racking mechanism 100 in the vertical position above drill floor 14. Mast braces 204 are no longer supporting the weight of automatic pipe racking mechanism 100. In this position, the verticality of automatic pipe racking mechanism 100 can be adjusted by adjustment of mast braces 204.

As described, the relationship of these elements has been shown to be extremely advantageous in providing an automatic pipe racking mechanism 100 that can be mounted to a conventional drill floor, and that is capable of lifting and moving drill pipe between a racked position within a largely conventional racking board and a stabbed position over a wellbore.

Having thus described the present invention by reference to selected embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of embodiments. Accordingly, it is appropriate that the appended claims be construed broadly and in a manner consistent with the scope of the invention.

The invention claimed is:

1. An automated pipe racker, comprising:
    a base frame pivotally connectable to a drill floor of a drilling rig offset to a drilling mast that is also connected to the drill floor, the base frame having an upper end and a lower end;
    a pair of base legs pivotally connected to the lower end of the base frame and movable between a retracted position for transportation and an extended position for connection to the drill floor;
    a pipe racking mechanism connected to the base frame, the racking mechanism extendable from the base frame to move stands of drilling tubulars from a vertical position over a wellbore, to a racked position on a stand platform or drill floor;
    a retractable mast brace pivotally connected to the upper end of the base frame and pivotally connectable to the drilling mast; and,
    a skid assembly affixed to the base frame on a side of the base frame opposite to the side pivotally connectable to the mast brace.

2. The automated pipe racker of claim 1, the skid assembly further comprising:
    an upper skid; and,
    a lower skid pivotally connected to the base frame and movable between an extended position for transportation and a retracted position for connection of the automatic pipe racker to the drill floor for rig-up.

3. The automated pipe racker of claim 2, the skid assembly further comprising:
    a ground pivot located near the center of gravity of the automated pipe racker when the automatic pipe racker is resting on the skid assembly;
    the upper skid portion extending substantially above the ground pivot; and,
    the lower skid portion extending substantially below the ground pivot.

4. The automated pipe racker of claim 2, further comprising:
    the ground pivot located near and below the center of gravity of the automated pipe racker when the automatic pipe racker is resting on the skid.

5. The automated pipe racker of claim 2, further comprising:
    a retractable standoff located between the base frame and lower skid.

6. The automated pipe racker of claim 5, further comprising:
    a wheel assembly connected to the standoff; and,
    the wheel assembly being exposed beneath the lower skid when the lower skid is retracted.

7. The automated pipe racker of claim 2, further comprising:
    a latch movable to lock or unlock the position of the lower skid in relation to the base frame.

8. The automated pipe racker of claim 2, further comprising:
    a jack located proximate to the upper skid, the jack extendable to tilt the pipe racker towards the lower skid when the lower skid is in the retracted position.

9. The automated pipe racker of claim 2, further comprising:
a wheel assembly connected to the jack; and,
the wheel assembly being exposed beneath the upper skid when the jack is extended to tilt the pipe racker.

10. The automated pipe racker of claim 1, further comprising:
the length of the mast brace being adjustable.

11. The automated pipe racker of claim 1, further comprising:
a pair of arms pivotally connected to the base frame and movable between a retracted position for transportation and an extended position.

12. The automated pipe racker of claim 1, further comprising,
a tension bar pivotally connectable between the drill floor of the drilling rig and the base frame of the pipe racker.

13. The automated pipe racker of claim 1, further comprising:
a wheel assembly connected to the base frame; and,
the pipe racker rotatable on the wheel assembly for positioning the racker into alignment with the drilling mast when extending from a substructure in a collapsed position.

14. A method of connecting a drill floor mounted automatic pipe racker to a drilling rig, comprising:
locating the automatic pipe racker having the features of claim 1 beneath a lowered drilling mast pivotally connected to a drill floor of a substructure in a collapsed position;
pivotally connecting the pipe racker to the drill floor;
pivotally connecting a mast brace between the pipe racker and the drilling mast; and,
raising the mast and the racker together to an upright position above the drill floor.

15. The method of claim 14, further comprising:
deploying base legs connected to a base frame of the automatic pipe racker from a retracted position to an extended position for pivotal connection to the drill floor.

16. The method of claim 14, further comprising:
locating a frame support beneath the mast.

17. The method of claim 14, further comprising:
pivotally connecting a tension bar between the drilling rig and a base frame of the automatic pipe racker.

18. The method of claim 14, further comprising:
positioning the automatic pipe racker on a skid connected to a base frame of the automatic pipe racker.

19. The method of claim 18, further comprising:
pivoting the automatic pipe racker on the skid.

20. The method of claim 14, further comprising:
positioning the automatic pipe racker on a wheel assembly connected to a base frame of the automatic pipe racker; and,
moving the pipe racker on the wheel assembly to align the pipe racker with the drilling mast.

21. The method of claim 14, further comprising:
positioning the automatic pipe racker on top of a wheel assembly connected to a base frame of the automatic pipe racker; and,
moving the pipe racker on the wheel assembly to align the pipe racker with the drilling mast.

22. The method of claim 14, further comprising:
positioning the automatic pipe racker on top of a rotate table connected to a base frame of the automatic pipe racker; and,
rotating the pipe racker on the rotate table to align the pipe racker with the drilling mast.

23. The method of claim 14, further comprising:
positioning the automatic pipe racker on top of a slider connected to a base frame of the automatic pipe racker; and,
sliding the pipe racker on the slider to align the pipe racker with the drilling mast.

24. A method of connecting a drill floor mounted automatic pipe racker to a drilling rig, comprising:
positioning an automatic pipe racker having the features of claim 1 beneath a drilling mast extending from a substructure in a collapsed position;
pivotally connecting legs of the pipe racker to a drill floor of the substructure;
pivotally connecting a mast brace between the pipe racker and the drilling mast;
hydraulically raising the mast from a position extending beyond the drill floor to a raised position above the drill floor; and,
the mast brace causing the racker to pivot to a raised position above the drill floor with the raising of the mast.

25. A method of transporting and rigging up a drill floor mounted automatic pipe racker to a drilling rig, comprising:
transporting a pipe racker having the features of claim 1 on a transport trailer on a skid assembly connected to a base frame of the pipe racker;
deploying retracted legs that are connectable to the drill floor;
deploying retracted mast braces that are connectable to a mast of the drilling rig;
tilting the pipe racker in the direction of a retracted lower skid portion of the skid assembly;
connecting the deployed legs to the drill floor;
connecting the deployed arms between the mast and the racker; and,
raising the mast and the racker to an upright position above the drill floor.

26. The automated pipe racker of claim 1, further comprising:
a rotatable turntable connected to the base frame; and
the pipe racker being rotatable on the turntable for positioning the racker into alignment with the drilling mast when extending from a substructure in a collapsed position.

27. The automated pipe racker of claim 1, further comprising:
a slider connected to the base frame; and,
the pipe racker being rotatable on the slider for positioning the racker into alignment with the drilling mast when extending from a substructure in a collapsed position.

* * * * *